United States Patent Office 2,932,647
Patented Apr. 12, 1960

2,932,647

THIOFORMAL AND ACETAL DERIVATIVES OF MERCAPTOPYRIDINE-1-OXIDE

Jack Rockett, Metuchen, N.J., assignor to Olin Mathieson Chemical Corporation, a corporation of Virginia No Drawing. Application August 26, 1958
Serial No. 757,201

9 Claims. (Cl. 260—294.8)

This invention relates to a new group of chemical compounds and to processes for their preparation. More particularly, this invention relates to new and useful mono- and dithioformal and acetal derivatives of 2-mercaptopyridine-oxide.

The compounds of this invention are the bases and the hydrohalides of the bases having the formula $$C_5H_4N(\rightarrow O)S.CHR'AR$$

in which A is oxygen or sulfur, R is hydrogen, hydrocarbon or halohydrocarbon radical, especially an alkyl, alkenyl, alicyclic or aryl radical containing 1 to 18 carbon atoms and R' is hydrogen, a lower alkyl group or a halogenated lower alkyl group containing 1 to 5 carbon atoms.

The 2-pyridyl-1-oxide radical, $C_5H_4N(\rightarrow O)S-$, in the above formula and the 2-mercaptopyridine-1-oxide have the structural formulas:

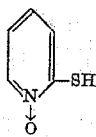    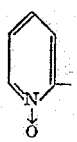

2-mercaptopyridine-1-oxide    2-pyridyl-1-oxide

The compounds of this invention are prepared by the reaction of a 2-mercaptopyridine-1-oxide compound in the form of the free acid or a salt with an alpha-haloether according to the following reaction scheme:

$$C_5H_4N(\rightarrow O)SM + ClCHR'AR$$
$$\rightarrow C_5H_4N(\rightarrow O)SCHR'AR + MCl$$

where M is a suitable cation, e.g., a metal or a positive radical, for example, hydrogen, sodium, potassium, ammonium or substituted ammonium. A, R, R' are as defined above. This reaction occurs readily and can be carried out in a variety of reaction media, although acetone or dioxane as the reaction medium is preferred when a salt of 2-mercaptopyridinethione is used.

Alternatively, the reaction can be carried out by employing 2-mercaptopyridine-1-oxide as a free acid in a non-polar solvent. The hydrohalide salts of this invention can thus be prepared in good yield. Benzene is the preferred medium for this reaction but other inert organic solvents, for example, ethylene dichloride can be used. Any hydrohalide salt can be prepared but the hydrochlorides and hydrobromides are particularly preferred.

The alpha-haloether or thioether employed in the above reaction may be prepared, for example, by the treatment of a suspension of paraformaldehyde in a suitable alcohol or mercaptan with a stream of gaseous hydrogen chloride according to the equation:

$$RAH + CH_2O + HCl \rightarrow RACH_2Cl + H_2O$$

in which R and A are defined before.

Alpha-chloroethers can also be prepared by other methods such as the chlorination of an aliphatic ether. For example, alpha,beta,beta'-trichlorodiethylether may be prepared by the process of Serial No. 330,351, now U.S. Patent No. 2,853,528, issued September 23, 1958. Examples of other alpha haloethers which can be used in the process of the present invention include alpha, beta-dichlorodiethyl ether, chloromethyl vinyl ether, and alpha,beta,beta'-trichlorodi-isopropyl ether. The resultant alpha-chloroethers or thioethers can be employed for the preparation of a mono or dithioformal or acetal according to the process herein described.

Some specific examples of compounds of the present invention, suitable reagents for reaction with 2-mercaptopyridine-1-oxide to form them, and radicals R and R' are shown in the following table:

| Ident. | Reagent | A | R | R' | Product |
|---|---|---|---|---|---|
| A | $CH_2O + HCl$ | O | H— | H— | $C_5H_4N(\rightarrow O)SCH_2OH$ <br> S-hydroxymethyl-2-mercaptopyridine-1-oxide. |
| B | $CH_3SCH_2I$ | S | $CH_3$— | H— | $C_5H_4N(\rightarrow O)SCH_2SCH_3$ <br> S-2-(pyridyl-1-oxide) S'-methyl dithioformal. |
| C | $C_2H_5SCH_2Br$ | S | $C_2H_5$— | H— | $C_5H_4N(\rightarrow O)SCH_2SC_2H_5$ <br> S-(2-pyridyl-1-oxide) S'-ethyl dithioformal. |
| D | $4\text{-}ClC_6H_4SCH_2Cl$ | S | $4\text{-}ClC_6H_4$— | H— | $C_5H_4N(\rightarrow O)SCH_2SC_6H_4Cl\text{-}4$ <br> S-(2-pyridyl-1-oxide) S'-4-chlorophenyl dithioformal. |
| E | $C_6H_5CH_2SCH_2Cl$ | S | $C_6H_5CH_2$— | H— | $C_5H_4N(\rightarrow O)SCH_2SCH_2C_6H_5$ <br> S-(2-pyridyl-1-oxide) S'-benzyl dithioformal. |
| F | $C_2H_5OCHClCH_3$ | O | $C_2H_5$— | $CH_3$— | $C_5H_4N(\rightarrow O)SCH(CH_3)OC_2H_5$ <br> S-(2-pyridyl-1-oxide) O-ethyl monothioacetal. |
| G | $CH_2:CHOCH_2Cl$ | O | $CH_2:CH$— | H | $C_5H_4N(\rightarrow O)SCH_2OCH:CH_2$ <br> S-(2-pyridyl-1-oxide (O-vinyl monothioformal. |
| H | $ClCH_2CH_2OCHClCH_2Cl$ | O | $ClCH_2CH_2$— | $CH_2Cl$ | $C_5H_4N(\rightarrow O)SCH(CH_2Cl)OCH_2CH_2Cl$ <br> S-(2-pyridyl-1-oxide) O-2-chloroethyl monothiomonochloroacetal. |

In addition, R' can also be beta,beta-dichloroethyl, isopropyl and n-amyl or other lower alkyl or halogenated lower alkyl group containing 1 to 5 carbon atoms. R can also be allyl, n- and iso-propyl, n-, iso, sec and tert-butyl, 2-ethylhexyl n-dodecyl, n-octadecyl, phenyl o-bromobenzyl and cyclohexyl or other hydrocarbon or halohydrocarbon radicals containing 1 to 18 carbon atoms.

The compounds of this invention are useful in diluted compositions as pesticides. They act as soil fungicides, foliage fungicides and in the control of weeds. They are able to penetrate the waxy coating of foliage and fruit and thus serve as longer lasting protective fungicides than for example, metal salts of organic acids, including the heavy metal salts of 2-mercaptopyridine-1-oxide. The compounds are used advantageously in a proportion of about 15 to 18 percent with any of the diluents usually employed for the application of foliar fungicides or for application to the soil where they control the activity of soil fungi. The compounds of this invention are oils or crystalline solids and are suitably dispersed on an inert finely divided solid and employed as a dust. Suitable solid carriers are clay, talc, bentonite, as well as other carriers known in the art. (See Frear, "Chemistry of Insecticides, Fungicides and Herbicides.") Microcel 805, a synthetic calcium silicate is an example of a suitable solid carrier. The compounds may also be applied as a spray in a liquid carrier either as a solution in a solvent or as a suspension in a non-solvent for example, water. When applied as a suspension, suitable wetting agents and dispersants are incorporated. Marasperse N is a suitable dispersant of the lignosulfonate type. Igepon AP-78, an ester of sodium isethionate, is a suitable wetting agent. The proportion of dispersant is suitably from about 1 to 3 percent and the wetting agent is suitably from about 2 to 10 percent of the composition. The compounds of this invention may also be admixed with carriers that are themselves active, such as other parasiticides, herbicides and fertilizers.

EXAMPLE I

S-(2pyridyl-1-oxide) O-methyl monothioformal

In a flask was placed 300 cc. of dioxane and 44.8 grams (0.3 mole) of the sodium salt of 2-mercaptopyridine-1-oxide. 24.2 grams (0.3 mole) of chloromethyl methyl ether were added dropwise, starting at 27° C. Heat evolved and an ice bath was applied intermittently to keep the temperature between 25° and 30° C. When the addition was completed, the mixture was heated to 55° C. for one hour and cooled. It was filtered and the dioxane was distilled at reduced pressure. There remained 45.1 grams of S-(2-pyridyl-1-oxide) O-methyl monothioformal, a clear, dark amber oil of medium viscosity. This represented an 87.8 percent yield.

*Analysis.*—Calc. for $C_7H_9NO_2S$: S, 18.72%; N, 8.19%. Found: S, 17.67%; N, 8.32%.

Tests as soil fungicides were carried out by placing discs of agar cultures 5 mm. in diameter of the pathogenic fungi listed in the table below on Petri dish plates of potato dextrose agar containing 10, 100 and 1000 parts per million, respectively, of the chemical being tested. The plates were then incubated for 48 hours at 20° C. to give satisfactory growth of the fungi on control plates containing no chemical. The growth of the fungi on the test plates was then observed and noted as "0" for no growth, indicated a kill of the fungi; "−" for grown of the original inoculum only, indicating a decided depressing effect of fungus growth but no kill of the fungus and "+" indicating no inhibition of fungal growth and, therefore, no pronounced depressing effect of the chemical being tested.

| Test Organism | S-(2-pyridyl-1-oxide) O-methyl monothioformal, p.p.m. | | |
|---|---|---|---|
| | 10 | $10^2$ | $10^3$ |
| Armillaria melea | + | 0 | 0 |
| Fusarium solani | + | + | 0 |
| F. oxysporum f. lycopersici | + | 0 | 0 |
| Phytophthora cactorum | + | 0 | 0 |
| Phytophthora cinnamomi | − | 0 | 0 |
| Phytophthora citrophthora | + | 0 | 0 |
| Pythium aphanidermatum | − | 0 | 0 |
| Pythium ultimum | + | 0 | 0 |
| Rhizoctonia solani | + | + | 0 |
| Sclarotinia sclerotiorum | − | 0 | 0 |
| Sclerotium rolfsii | + | − | 0 |
| Streptomyces scabies | + | 0 | 0 |
| Verticillium albo-atrum | + | + | 0 |

These data show complete control of all of the several fungi tested at 1000 parts per million, nearly complete control at 100 p.p.m. and partial control with as low as 10 p.p.m. of this anti-fungal agent.

EXAMPLE II

S-(2-pyridyl-1-oxide) O-n-propyl monothioformal

In a flask was placed 300 cc. of dioxane and 44.8 grams (0.3 mole) of sodium salt of 2-mercaptopyridine-1-oxide. 32.6 grams (0.3 mole) of chloromethyl-n-propyl ether were added, dropwise. By intermittent cooling with an ice bath the temperature was kept at 20–30° C. The flask contents were then heated to 55–60° C. for three hours. The reaction mixture was filtered and the dioxane was distilled from the filtrate leaving a residual brown oil, 51.4 grams. This represented an 86.2 percent yield of the desired S-(2-pyridyl-1-oxide) O-n-propyl monothioformal.

*Analysis.*—Calc. for $C_9H_{13}NO_2S$: S, 16.08%; N, 7.03%. Found: S, 17.41%; N, 8.15%.

This anti-fungal agent was tested as described in Example I with the following results:

| Test Organism | S-(2-pyridyl-1-oxide) O-n-propyl monothioformal, p.p.m. | | |
|---|---|---|---|
| | 10 | $10^2$ | $10^3$ |
| Armillaria melea | 0 | 0 | 0 |
| Fusarium solani | 0 | 0 | 0 |
| F. oxysporum f. lycopersici | 0 | 0 | 0 |
| Phytophthora cactorum | 0 | 0 | 0 |
| Phytophthora cinnamomi | 0 | 0 | 0 |
| Phytophthora citrophthora | 0 | 0 | 0 |
| Pythium aphanidermatum | 0 | 0 | 0 |
| Pythium ultimum | 0 | 0 | 0 |
| Rhizoctonia solani | − | − | 0 |
| Sclarotinia sclerotiorum | 0 | 0 | 0 |
| Sclerotium rolfsii | 0 | 0 | 0 |
| Streptomyces scabies | 0 | 0 | 0 |
| Verticillium albo-atrum | 0 | 0 | 0 |

These data show substantially complete control of all of the several fungi tested with as little as 10 parts per million of this anti-fungal agent.

EXAMPLE III

S-(2-pyridyl-1-)O-2-chloroethyl monothiochloroacetal

In a flask was placed 44.8 grams (0.3 mole) of the sodium salt of 2-mercaptopyridine-1-oxide and 300 cc. of dioxane. The flask was cooled, intermittently, by ice bath as 42.8 grams (0.3 mole) of alpha,beta-dichloroethyl ethyl ether was added dropwise. The temperature was now raised to 50° and kept there for four hours. The reaction mixture was filtered and the dioxane was distilled at reduced pressure. There remained 48.5 grams of a clear red oil. This represented a 69.3 percent yield.

EXAMPLE IV

S-hydroxymethyl-2-mercaptopyridine-1-oxide hydrochloride

To a solution of 38.1 grams (0.3 mole) of 2-mercaptopyridine-1-oxide in 250 cc. of ethylene dichloride was added 9.0 grams (0.3 mole) of paraformaldehyde. The suspension was cooled by an ice bath and gaseous hydrogen chloride was passed in for four hours. A heavy precipitate formed which was filtered and dried. The pale ivory colored crystalline material weighed 56.9 grams, a 98.0 percent yield. The product was S-hydroxymethyl-2-mercaptopyridine-1-oxide hydrochloride, M.P. 101–108° C.

*Analysis.*—Calc. for $C_6H_8ClNO_2S$: Cl, 18.35%; C, 37.2%; H, 4.13%. Found: Cl, 18.32%; C, 36.57%; H, 4.31%.

EXAMPLE V

S-(2-pyridyl-1-oxide) O-n-dodecyl monothioformal 0.20 gram mole of the sodium salt of 2-mercaptopyridine-1-oxide was suspended in 500 ml. of acetone. 0.20 gram mole of chloromethyl-n-dodecyl ether was added over a period of 14 minutes at 24–31° C. The mixture was refluxed for 2½ hours and filtered hot to remove by-product sodium chloride. Cooling the filtrate yielded 0.175 gram mole of crude n-dodecyl thioformal (88% yield), M.P. 73–77° C. Recrystallization from isopropyl ether yielded 0.117 mole of product, M.P. 78–79.5° C.

*Analysis.*—Sulfur, theory, 9.84%; found, 10.31%.

EXAMPLE VI

S-(2pyridyl-1-oxide) O-ethyl monothioformal

Following the procedure of Example V, the sodium salt of 2-mercaptopyridine-1-oxide was treated with chloromethyl ethyl ether. The yield of S-(2-pyridyl-1-oxide) O-ethyl monothioformal was 97 percent of a solid, M.P. 62–66° C. It contained 19.0 percent sulfur compared with a theoretical value of 17.3 percent.

EXAMPLE VII

S-(2-pyridyl-1-oxide) O-isopropyl monothioformal

Following the procedure of Example V, the sodium salt of 2-mercaptopyridine-1-oxide was treated with chloromethyl isopropyl ether. The yield of S-(2-pyridyl-1-oxide) O-isopropyl monothioformal was 90 percent of an oil containing 16.5 percent sulfur compared with a theoretical value of 16.1 percent.

EXAMPLE VIII

S-(2-pyridyl-1-oxide) O-n-octadecyl monothioformal

Following the procedure of Example V, the sodium salt of 2-mercaptopyridine-1-oxide was treated with chloromethyl n-octadecyl ether. The yield of S-(2-pyridyl-1-oxide) O-n-octadecyl monothioformal was 63 percent of a solid, M.P. 90–93° C. It contained 8.1 percent sulfur which is the theoretical value.

EXAMPLE IX

S-(2-pyridyl-1-oxide) S'-methyl dithioformal

Following the procedure of Example V, the sodium salt of 2-mercaptopyridine-1-oxide was treated with chloromethyl methyl sulfide. The yield of S-(2-pyridyl-1-oxide) S'-methyl dithioformal was 63 percent of a solid, M.P. 106–107° C. It contained 34.1 percent sulfur compared with a theoretical value of 34.2 percent.

EXAMPLE X

S-(2-pyridyl-1-oxide) O-iso-octyl monothioformal hydrochloride

To 0.25 gram mole of 2-mercaptopyridine-1-oxide dissolved in 400 grams of benzene was added 0.25 gram mole of chloromethyl iso-octyl ether over a period of 30 minutes at room temperature. The mixture was maintained at 60° C. for two hours, then cooled to 10° C. at which point crystallization occurred. Filtration yielded 0.109 gram mole of S-(2-pyridyl-1-oxide) O-iso-octyl monothioformal hydrochloride, M.P. 75–76° C. Concentration of the filtrate to half its volume yielded an additional 0.09 gram mole, or a total yield of 80 percent.

*Analysis.*—Sulfur, theory, 10.5%; found, 10.5%.

EXAMPLE XI

S-(2-pyridyl-1-oxide) S'-n-propyl dithioformal hydrochloride

Following the procedure of Example X, 2-mercaptopyridine-1-oxide was treated with chloromethyl n-propyl sulfide. The resulting S-(2-pyridyl-1-oxide) S'-n-propyl dithioformal hydrochloride was obtained in 68 percent yield, M.P. 97.5–99° C.

*Analysis.*—Calc. for $C_9H_{14}NOS_2Cl$: S, 25.45%; N, 5.56%. Found: S, 24.32%; N, 5.29%.

I claim:

1. A compound selected from the group consisting of free bases and hydrohalides of free bases having the formula:

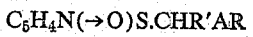

$$C_5H_4N(\rightarrow O)S.CHR'AR$$

wherein R is selected from the group consisting of hydrogen and alkyl, alkenyl, cycloalkyl and monocyclic aryl and chloro- and bromo-alkyl, alkenyl, cycloalkyl and monocyclic aryl containing 1 to 18 carbon atoms, R' is selected from the group consisting of hydrogen and lower alkyl and chloro- and bromo-lower alkyl containing 1 to 5 carbon atoms and A is selected from the group consisting of S and O.

2. S-(2-pyridyl-1-oxide) O-methyl monothioformal.
3. S-hydroxymethyl-2-mercaptopyridine-1-oxide hydrochloride.
4. S-(pyridyl-1-oxide) O-dodecyl monothioformal.
5. S-(2-pyridyl-1-oxide) S'-n-propyl dithioformal hydrochloride.
6. S-(2-pyridyl-1-oxide) O-2-chloroethyl monothiomonochloroacetal.
7. A process for the preparation of a compound according to claim 1 which comprises reacting a 2-mercaptopyridine-1-oxide compound with a compound selected from the group consisting of alpha-halothioether and alpha-haloether.
8. A process for the preparation of a compound according to claim 1 which comprises reacting a salt of 2-mercaptopyridine-1-oxide with a compound selected from the group consisting of alpha-chlorothioether and alpha-chloroether.
9. A process for the preparation of a compound according to claim 1 which comprises reacting 2-mercaptopyridine-1-oxide with a compound selected from the group consisting of alpha-chlorothioether and alpha-chloroether and recovering the hydrochloride product.

References Cited in the file of this patent
UNITED STATES PATENTS

| | | |
|---|---|---|
| 2,686,786 | Shaw et al. | Aug. 17, 1954 |
| 2,734,903 | Leonard | Feb. 14, 1956 |

UNITED STATES PATENT OFFICE

CERTIFICATE OF CORRECTION

Patent No. 2,932,647     April 12, 1960

Jack Rockett

It is hereby certified that error appears in the printed specification of the above numbered patent requiring correction and that the said Letters Patent should read as corrected below.

Column 2, line 64, for "18" read -- 80 --; column 6, line 28, for "-(pyridyl-1-oxide)" read ---(2-pyridyl-1-oxide) --.

Signed and sealed this 27th day of September 1960.

(SEAL)
Attest:

KARL H. AXLINE
Attesting Officer

ROBERT C. WATSON
Commissioner of Patents